United States Patent
Campbell et al.

(10) Patent No.: US 9,483,567 B2
(45) Date of Patent: Nov. 1, 2016

(54) METHOD AND APPARATUS FOR PROVIDING SUGGESTIONS DRIVEN BY NEARBY FAVORITES

(71) Applicant: GOOGLE INC., Mountain View, CA (US)

(72) Inventors: Taj J. Campbell, San Francisco, CA (US); Daniel Graf, San Francisco, CA (US)

(73) Assignee: GOOGLE INC., Mountain View, CA (US)

(*) Notice: Subject to any disclaimer, the term of this patent is extended or adjusted under 35 U.S.C. 154(b) by 373 days.

(21) Appl. No.: 13/842,331

(22) Filed: Mar. 15, 2013

(65) Prior Publication Data

US 2014/0280060 A1    Sep. 18, 2014

(51) Int. Cl.
G06F 17/30    (2006.01)
(52) U.S. Cl.
CPC ..... G06F 17/3087 (2013.01); G06F 17/30241 (2013.01)
(58) Field of Classification Search
CPC ................. G06F 17/30241; G06F 17/3087
USPC ............ 707/722, 723, 724, E17.11, E17.018
See application file for complete search history.

(56) References Cited

U.S. PATENT DOCUMENTS

| | | | | |
|---|---|---|---|---|
| 8,239,130 B1* | 8/2012 | Upstill | ............... | G01C 21/3679 701/400 |
| 8,260,320 B2 | 9/2012 | Herz | | |
| 8,285,483 B2* | 10/2012 | Amer-Yahia | .......... | G01C 21/00 701/428 |
| 8,589,069 B1* | 11/2013 | Lehman | .......... | G01C 21/20 340/995.1 |
| 8,954,860 B1* | 2/2015 | Hands | ............... | G06F 17/30873 715/738 |
| 2003/0128865 A1* | 7/2003 | White | .......... | G09B 29/004 382/113 |
| 2010/0121661 A1* | 5/2010 | Won | .......... | G06Q 50/14 705/5 |
| 2010/0179756 A1* | 7/2010 | Higgins et al. | ............... | 701/210 |
| 2010/0331016 A1 | 12/2010 | Dutton et al. | | |
| 2011/0151898 A1* | 6/2011 | Chandra | .......... | H04W 4/02 455/466 |

(Continued)

FOREIGN PATENT DOCUMENTS

| | | |
|---|---|---|
| KR | 10-2009-0033989 | 4/2009 |
| KR | 10-2012-0029980 | 3/2012 |

OTHER PUBLICATIONS

Echtibi et al ("Murshid: A Mobile Tourist Companion," Proc. 1st International Workshop on Context-Aware Middleware and Services (CAMS 2009), Jun. 16, Dublin, Ireland, pp. 6-11): http://delivery.acm.org/10.1145/1560000/1554236/p6-echtibi.pdf?ip=151.207.250.71&id=1554236&acc=ACTIVE%20SERVICE&key=C15944E53D0ACA63%2E4D4702B0C3E38B35%2E4D4702B0C3E38B35%.*

(Continued)

*Primary Examiner* — Phong Nguyen
(74) *Attorney, Agent, or Firm* — Marshall, Gerstein & Borun LLP (57) ABSTRACT

A computer-implemented method and system may promote points of interest (POIs) for display on a digital map at a client computing device based on context information associated with a user. Location data from a client computing device may indicate a geographic location of the computing device. Using the location data, the system may determine a user classification indicating a degree of familiarity with the location indicated by the location data. Promotion data may be determined based on the location data and the user classification. The promotion data may indicate one or more sets of POIs to be promoted. The system may then send the determined promotion data to the client computing device, enabling display on the client computing device of the one or more indicated sets of POIs.

18 Claims, 11 Drawing Sheets

(56) References Cited

U.S. PATENT DOCUMENTS

| | | | | |
|---|---|---|---|---|
| 2011/0202267 A1* | 8/2011 | Amer-Yahia | ........... | G01C 21/00 701/532 |
| 2013/0097246 A1* | 4/2013 | Zifroni | ................... | G06Q 50/01 709/204 |
| 2014/0067901 A1* | 3/2014 | Shaw | ..................... | G06Q 10/10 709/201 |
| 2014/0210590 A1* | 7/2014 | Castro | ................ | G07C 9/00563 340/5.52 |
| 2015/0073941 A1* | 3/2015 | Burrows | ................ | G06Q 10/02 705/26.62 |

OTHER PUBLICATIONS

Garcia-Crespo et al ("SPETA: Social pervasive e-Tourism advisor," Telematics and Informatics, vol. 26, pp. 306-315, 2009)http://65.54.113.26/Publication/4770771/speta-social-pervasive-e-tourism-advisor.*

Echtibi et al ("A Service-Based Mobile Tourist Advisor," International Journal of Computer Information Systems and Industrial Management Applications (IJCISIM) ISSN: 2150-7988 vol. 1 (2009), pp. 177-187) http://www.mirlabs.org/ijcisim.*

Noel et al., "Designing a Knowledge-Based Tourism Information System," *Int. J. Digital Culture and Electronic Tourism*, x(x): 1-17 (2008).

Sarkaleh et al., "Designing a Tourism Recommender System Based on Location, Mobile Device and User Features in Museum," *International Journal of Managing Information Technology*, 4(2):13-21 (2012).

Zheng et al., "Learning Travel Recommendations from User-Generated GPS Traces," *ACM Transactions on Intelligent Systems and Technology*, 2(1):1-29 (2011).

International Search Report and Written Opinion for Application No. PCT/US2014/025801, dated Jun. 30, 2015.

International Preliminary Report on Patentability for Application No. PCT/US2014/025801, dated Sep. 15, 2015.

\* cited by examiner

METHOD AND APPARATUS FOR PROVIDING SUGGESTIONS DRIVEN BY NEARBY FAVORITES

FIELD OF TECHNOLOGY

The present disclosure relates generally to generating and displaying maps within a web-based mapping system and, more particularly, to generating and displaying suggestions of points of interest based on user context information.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Many mobile computing devices such as cellular phones, tablet computers, notebooks, etc., incorporate global positioning system (GPS) applications and related hardware. When actuated on the device, the GPS applications may communicate with a GPS transmitter or other GPS hardware on the device and a backend application server to provide a digital map of an area around the device's current position to a user, as well as label data and place page data. While traveling, a tourist may use a web-based or other mapping system to display a map of their proposed destination. Similarly, because these computing devices are mobile, users travel with the devices and use them to display maps of unfamiliar destinations. Likewise, users may use these devices while in their local area to display maps of familiar destinations.

Typical mapping systems generate and display identical maps for every user. For example, the mapping system may receive a request from both a local resident and a tourist for a map of a particular area. In response to the request, typical mapping systems return identical or nearly identical maps regardless of whether the requestor is a local resident of the requested map area or a tourist visiting or searching for the same requested map area.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

The computer system and method described in this disclosure provides points of interest (POIs) suggestions to a user of a mapping application on a computing device. These suggestions are determined based on context information, such as, e.g., the location of the user, the familiarity of the user with the location, time of day, information about the POIs, and other user profile data. Information about the POIs, such as, e.g., categories, sub-categories, recommendations, and distance, can be used to determine the suggestions and organize suggestions into categories of POIs. Once suggestions of POIs and/or categories of POIs have been suggested to the user, the user may navigate through the suggestions and subsequently request more information on the suggestions. If the user selects a suggested POI, information on that particular POI is requested, and that POI is displayed in the mapping application on the computing device.

In one embodiment, a computer-implemented method may promote POIs for display on a digital map at a client computing device based on context information associated with a user. The method may receive location data from a client computing device. The location data may indicate a geographic location of the computing device. The method may also determine a user classification based on the location data. The user classification may indicate a degree of familiarity with the location indicated by the location data. The method may also determine promotion data based on the location data and the user classification, where the promotion data indicates one or more sets of POIs to be promoted. Further, the method may send the determined promotion data to the client computing device, wherein the promotion data enables display on the client computing device of the one or more indicated sets of POIs. After sending the determined promotion data to the client computing device, the method may receive a request for mapping data, wherein the requested mapping data corresponds to a location of a promoted POI, and send the requested mapping data to the client computing device in response to the subsequent request.

In another embodiment, a computer-implemented method may promote points of interest (POIs) for display on a digital map at a mobile computing device based on context information associated with a user. The method may send location data from a mobile computing device, the location data indicating a geographic location of the computing device. The method may also receive promotion data, indicating one or more sets of POIs to be promoted, based on the location data and user classification, wherein the user classification is based on a degree of familiarity with the location indicated by the location data. Further, the method may promote one or more sets of POIs on the mobile computing device and send a request for mapping data, wherein the requested mapping data corresponds to a promoted POI. Finally, the method may receive the requested mapping data on the mobile computing device in response to the subsequent request.

In another embodiment, a computer system may promote points of interest (POIs) for display on a digital map at a client computing device based on context information associated with a user. The system may comprise a point of interest selection system in communication with a memory storing instructions for execution on a processor of the point of interest selection system. The instructions of the point of interest selection system may receive location data from a client computing device, the location data indicating a geographic location of the computing device, determine a user classification based on the location data, the user classification indicating a degree of familiarity with the location indicated by the location data, and determine promotion data based on the location data and the user classification, the promotion data indicating one or more sets of POIs to be promoted. The system may also include a mapping system in communication with a memory storing instructions for execution on a processor of the mapping system. The instructions of the mapping system may send promotion data to the client computing device, wherein the promotion data enables display on the client computing device of the one or more indicated sets of POIs, subsequently receive a request for mapping data, wherein the requested mapping data corresponds to the location of a promoted POI, and send the requested mapping data to the client computing device in response to the subsequent request.

In another embodiment, a computer system may promote points of interest (POIs) for display on a digital map at a client computing device based on context information associated with a user. The system may comprise means for receiving location data from a client computing device, the location data indicating a geographic location of the computing device, a means for determining a user classification based on the location data, the user classification indicating a degree of familiarity with the location indicated by the location data, and a means for determining promotion data based on the location data and the user classification, the promotion data indicating one or more sets of POIs to be promoted. The system may also include a means for sending promotion data to the client computing device, wherein the promotion data enables display on the client computing device of the one or more indicated sets of POIs, a means for subsequently receiving a request for mapping data, wherein the requested mapping data corresponds to the location of a promoted POI, and a means for sending the requested mapping data to the client computing device in response to the subsequent request.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
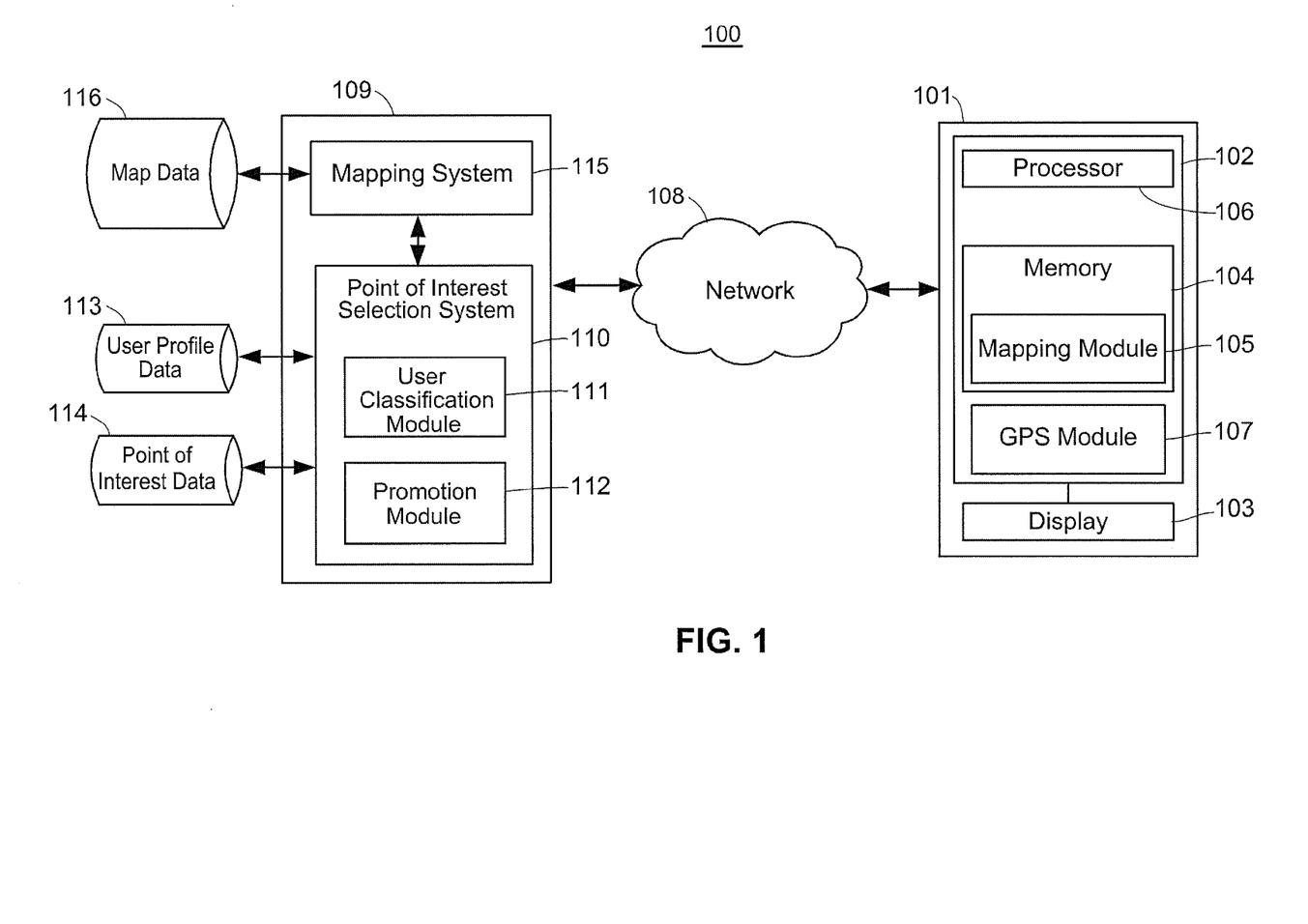
FIG. 1 illustrates one example of a high-level block diagram of a system for determining points of interest (POIs) for display on a digital map at a client computing device based on at least location and classification of a user.

FIG. 1 is a high-level block diagram of a system for determining points of interest (POIs) for display on a digital map at a client computing device based on at least location and classification of a user. Although FIG. 1 illustrates a client-server network environment, other aspects of the system 100 may include other configurations (peer-to-peer, single system, cloud, etc.). Generally, the system may include front end components 101 and back end components 109 that are communicatively linked via a network 108. The front end components 101 may include a client computing device 102 and display device 103. The client computing device 102 may include a memory 104 storing a mapping module 105. A processor 106 may execute instructions of the mapping module 105 to request, receive, process, and display maps and/or POI information, as herein described. A GPS module 107 may include a GPS transceiver to provide the mapping module 105 with location data corresponding to a current geographic location of the client computing device. The client computing device 102 may include a personal computer, smart phone, tablet computer, or other computing device. The computing device 102 is capable of executing the various modules, instructions, etc., described herein. The mapping module 105 may communicate with backend components 109 including a mapping system 115 and a point of interest (POI) selection system 110 via a network 108 such as the Internet or other type of networks (e.g., LAN, a MAN, a WAN, a mobile, a wired or wireless network, a private network, or a virtual private network, etc.).

For simplicity, the client device 102 is illustrated with a single processor 106 to execute various modules stored in the device memory 104, as described herein. The client device 102 in other embodiments may include additional processing units (not shown) such as a graphics processing unit (GPU) configured to facilitate image rendering on the display 103, for example. Further, the mapping module 105 may utilize a library of graphics functions for efficiently generating a map image. For example, the memory 104 may store a plugin, such as an OpenGL® or Direct3D® library, having functions for rendering graphics which various applications executing on the client 102, including the mapping module 105, may access via an application programming interface (API). In another embodiment, the memory 104 stores a plugin particularly suitable for browser applications, such as WebGL®, for example. Also, in some embodiments, the memory 104 stores additional software components that facilitate efficient rendering of images via the display device 103. For example, the memory 104 may store an Adobe® Flash® plugin or an O3D plugin.

While the system 100 is illustrated in FIG. 1 as including the mapping system 115 and the point of interest selection system 110 as backend components, the components and functions of the system 100 described herein may also be incorporated on the client computing device 102. For example, the POI selection system 110 may be implemented as computer-executable instructions of the mapping module 105, the mapping system 115 or as a separate module or system.

The mapping system 115 may include or communicate with a database containing map data 116.

In some embodiments, the point of interest selection system 110 may include one or more modules stored within memories of the various system components. The modules may include instructions that, when executed by a processor, identify a user of a client computing device 102 that is currently using the mapping system 115 as tied to a particular geographic region. In some embodiments, the point of interest selection system 110 may execute instructions in a user classification module 111 to compare a current location of the user (via a GPS module 107) to other data, such as the user profile data 113, to indicate whether the user may be currently classified as, e.g., a "tourist" or a "local". This classification may be used as an indication of the user's familiarity with POIs within a given geographic area. Using this classification, the user's location, and any other available context data, the promotion module 112 may select POIs and/or categories of POIs from a point of interest database 114. These selected POIs and/or categories of POIs for promotion may be communicated back to the mapping system 115 and/or directly to the user device 102 over the network 108.

Figure 2:
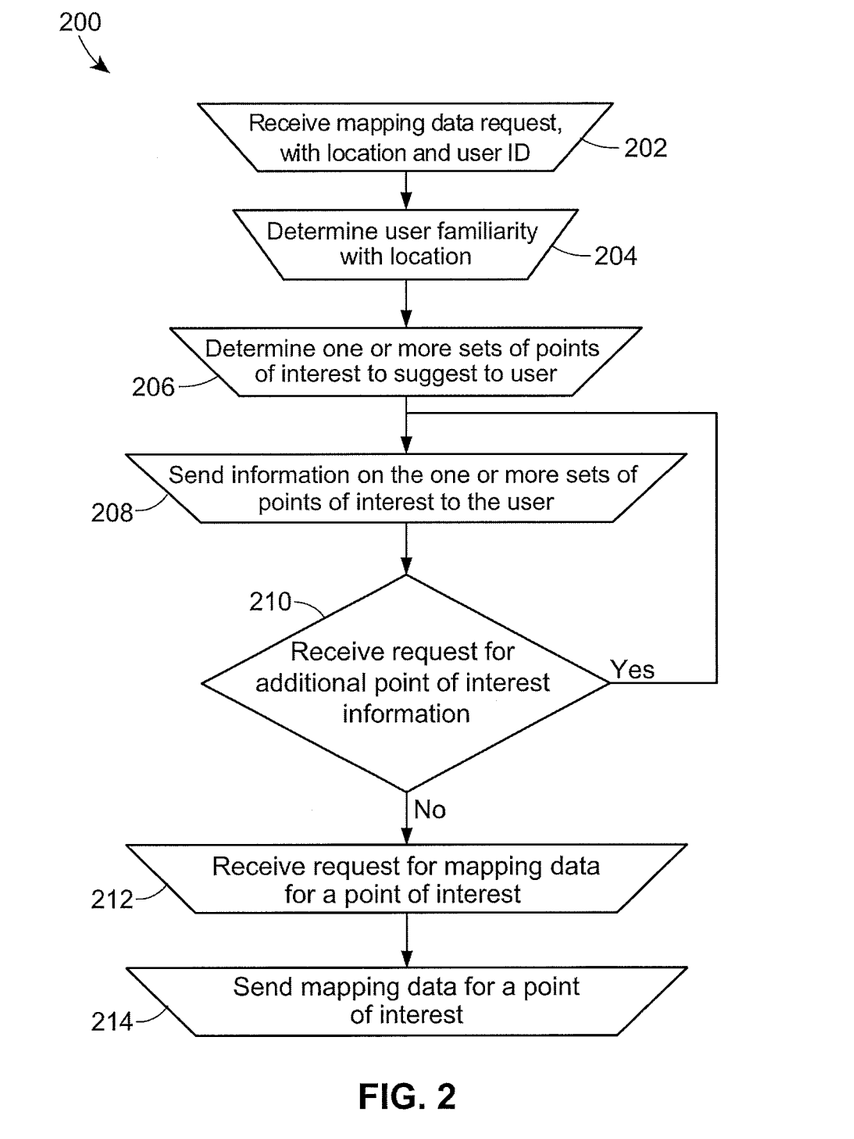
FIG. 2 illustrates an exemplary flow chart of one method for determining POIs for display on a digital map at a client computing device based on at least location and classification of a user.

FIG. 2 is an exemplary flow chart of one method for determining POIs for display on a digital map at a client computing device based on at least location and classification of a user. The method 200 may include one or more blocks, modules, functions, pipelines, or routines in the form of computer-executable instructions that are stored in a tangible computer-readable medium and executed using a processor 116, 130a, 144a of the client device 102 (e.g., a smart phone, tablet computer, or a mobile computing device, or other personal computing device, as described herein) or one or more servers 130, 144. The method 200 may be included as part of any modules of a computing environment for a system 100 for promoting POIs for display to users based on their classification as a tourist or local, generating and displaying maps, for example, or as part of a module that is external to such a system. Further, a user may activate or disable one or more options to allow or prohibit the system 100 to collect or send any user profile or other user-identifying data (e.g., preferred locations, current location, etc.) from any sources executing at or in communication with the client device 102. For example, a user interface of the mapping module 105 may allow a user to opt-in or opt-out of any user data use or collection as described herein. Furthermore, the method 200 may only use or access data that corresponds to a user in any way if the user affirmatively consents to such data use or access.

With reference to FIG. 2, a method 200 may cause the system 100 to execute instructions to determine POI data for promotion on the user device 102. At block 202, the system 100 may execute instructions to receive a mapping data request, which contains location data and user identity. The location data corresponds to a location of the computing device that sent the mapping data request. The computing device may determine its location using a GPS module, signal triangulation (e.g., cellular towers, wi-fi signals, radio signals, etc.), or other location methods. The user identify may include an indication of a user that is currently using the computing device that sent the mapping data request. For example, the indication may correspond to a user profile for a user that is logged on to a web or other service using the computing device. The client device may also automatically send the mapping data request upon the occurrence or satisfaction of one or more conditions. Occurrences or conditions may include a user may initiating a mapping application at the computing device, the device operating system detecting a new location of the device (e.g., a system refresh when a user lands in a foreign airport, etc.), a mapping application detecting a new location of the device while the mapping application is running in the background of the device, etc.

At block 204, the system 100 may execute instructions to compare location data corresponding to a client computing device with user profile data to determine a user classification as a "tourist" or a "local". The user classification may indicate a degree of familiarity with the location of the client computing device.

At block 206, the system 100 may execute instructions to determine POIs, and/or categories of POIs, for promotion on the client computing device. In addition to the user classification and location data, this determination may make use of any other available data, such as the time of day, weather, personal interests, personal interests or experiences of friends from social media data, etc. Based on this information, examples of promoted POIs may include suggested nightclubs where the time and location indicate the user may be concluding dinner, a currency exchange where the location indicates that the user may be arriving by plane in a new foreign location, etc. This determination may also use information about the user and his/her friends' recommendations using social media data, or recommendations based on classification such as tourist-friendly, recommended by local experts, popularity, etc.

Typically, the promotion of a POI will be accomplished by displaying these POIs, and/or categories of POIs, as suggestions to the user. In addition to determining the selection of POIs, and/or categories of POIs to promote, the method may also determine the display order of promoted elements.

At block 208, the system 100 may execute instructions to send the promotion data containing the selected POIs and/or categories of POIs, optionally in a particular order, to the client computing device. The client computing device may then process the promotion data to display the various promoted POIs and related information to the user.

At block 210, the system 100 may execute instructions to determine if the user has selected a category of POIs. If yes, the method may further select POIs and/or categories of POIs for promotion. These steps may repeat for as many layers of categories and sub-categories are present.

At block 212, the system 100 may execute instructions to receive a request for mapping data corresponding to a particular promoted POI upon selection of the displayed, promoted POI by the user. At block 214, the system 100 may execute instructions to send the requested mapping data to the client computing device in response to the user selection of the promoted POI.

Figure 3:
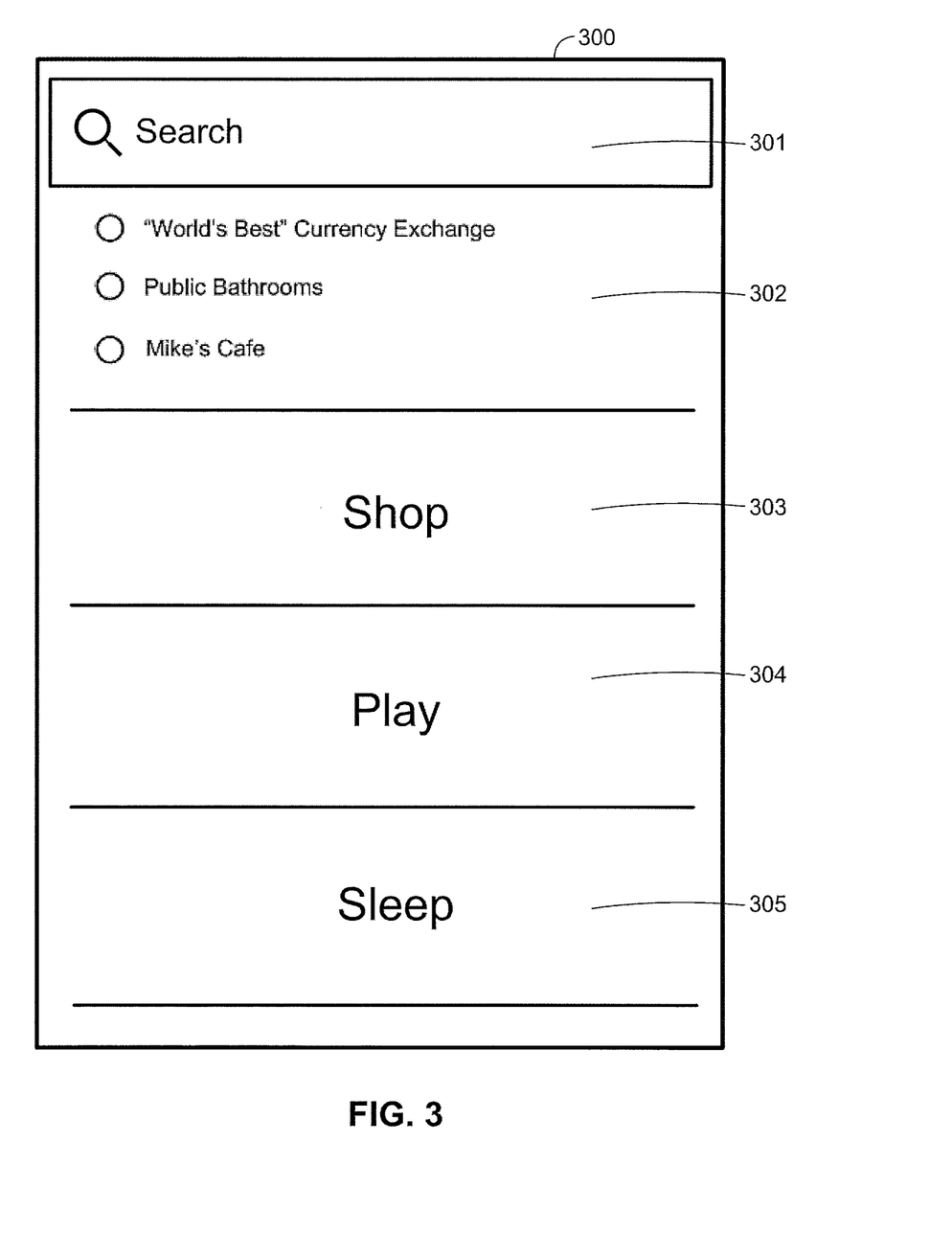
FIG. 3 illustrates an exemplary screen shot on a client computing device of POIs and categories of POIs where the user is in an unfamiliar location.

FIG. 3 illustrates an exemplary screen shot on a client computing device 101 of POIs and categories of POIs where the user is in an unfamiliar location and classified as a tourist. In some embodiments, this is the initial screen 300 the computing device displays to the user upon initiation of the mapping application 105 upon the user being classified as a tourist. The computing device 101 may process the received promotion data to display a search entry box 301, promoted POIs 302, categories of POIs 303, 304, and 305. The screen 300 may allow the user to interact with one or more elements displayed on the screen by selecting an element (e.g., by a touch or other gesture, mouse click, mouse over, or other action with a pointer, pressing an enter key, etc.). The search element 301 may cause the computing device 101 to execute instructions to determine if any POIs satisfy one or more search parameters entered within the search element 301. The promoted POIs 302 may be determined based on user context data (e.g., a tourist). Context data may also include location, time, user profile data, user favorites or a search history, etc. Where the user is unfamiliar with the area and may have just arrived (i.e., a tourist classification), a currency exchange and public bathrooms are promoted to be displayed within the initial screen 300. Categories of POIs 303, 304, and 305 may also be promoted based on the context data. For example, when the system determines that a user is a tourist, categories of Shop 303, Play 304, and Sleep 305 may be promoted over categories that are typically associated with local users or users that are familiar with the area corresponding to the current location of the computing device 101. These categories may be promoted in a particular order, or categories may be included or omitted based on the context data.

Figure 4:
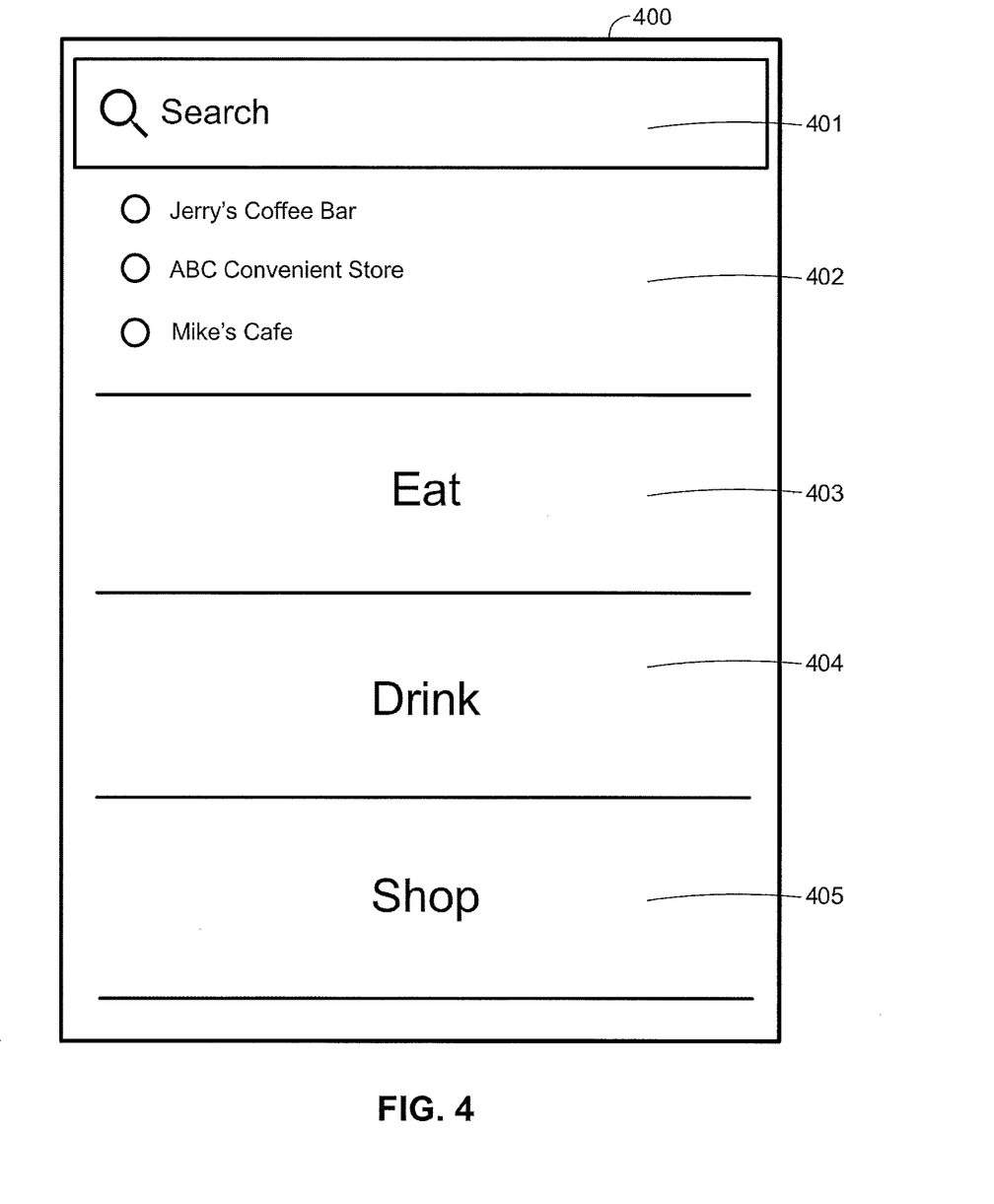
FIG. 4 illustrates an exemplary screen shot on a client computing device of POIs and categories of POIs where the user is in a familiar location.

FIG. 4 illustrates an exemplary screen shot on a client computing device 101 of POIs and categories of POIs where the user is in a familiar location and classified as a local. In some embodiments, this is the initial screen 300 the computing device displays to the user upon initiation of the mapping application 105 upon the user being classified as a local. The computing device 101 may process the received promotion data to display a search entry box 401, promoted POIs 402, categories of POIs 403, 404, and 405. The screen 400 may allow the user to interact with one or more elements displayed on the screen by selecting an element (e.g., by a touch or other gesture, mouse click, mouse over, or other action with a pointer, pressing an enter key, etc.). The search element 401 may cause the computing device 101 to execute instructions to determine if any POIs satisfy one or more search parameters entered within the search element 401. The promoted POIs 402 may be determined based on user context data (e.g., local user). Context data may also include location, time, user profile data, user favorites or a search history, etc. In this case, as the user is familiar with the area, common destinations for locals are promoted, such as a coffee bar and a convenient store. The selection of these POIs may also be based on the user's favorite locations in the area. Categories of POIs 403, 404, and 405 may also be promoted based on the context data. For example, when the system determines that a user is a local, a categories of Eat 403, Drink 404, and Shop 405 may be promoted over categories that are typically associated with tourist users or users that are unfamiliar with the area corresponding to the current location of the computing device 101. These categories may be promoted in a particular order, or categories may be included or omitted based on the context data.

Figure 5:
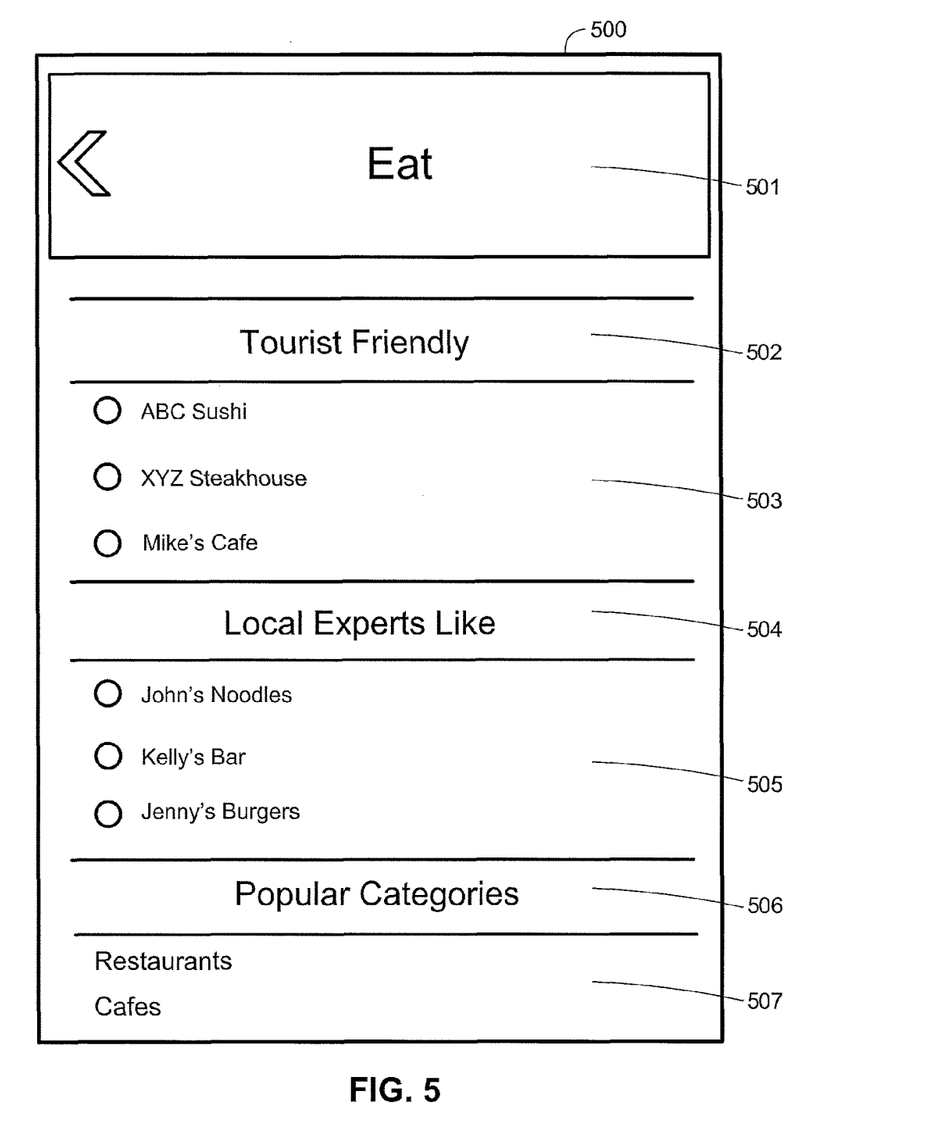
FIG. 5 illustrates an exemplary screen shot on a client computing device of POIs and sub-categories of POIs, after a user has limited the POIs to one category, where the user is in an unfamiliar location.

FIG. 5 illustrates an exemplary screen shot 500 on a client computing device of POIs and sub-categories of POIs, after a user has limited the POIs to one category, where the user is in an unfamiliar location. For example, here the user has selected the "Eat" category 501. POIs 503 and 505 are arranged under sub-categories 502 and 504. These sub-categories may be included or omitted, or the order selected, depending on the context data. Further sub-categories 507 may also be suggested.

Figure 6:
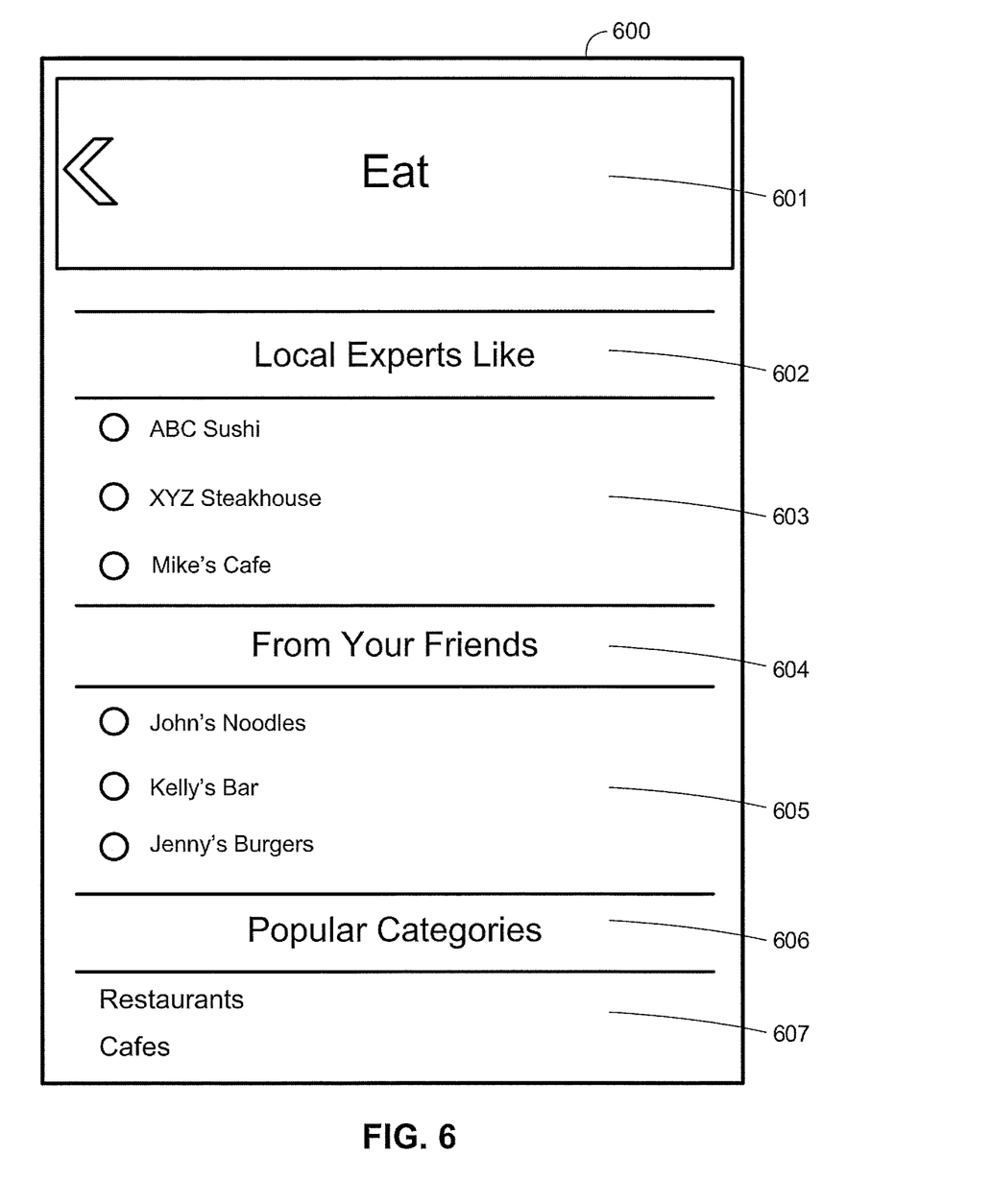
FIG. 6 illustrates an exemplary screen shot on a client computing device of POIs and sub-categories of POIs, after a user has limited the POIs to one category, where the user is in a familiar location.

FIG. 6 illustrates an exemplary screen shot 600 on a client computing device of POIs and sub-categories of POIs, after a user has limited the POIs to one category, where the user is in a familiar location. For example, here the user has selected the "Eat" category 601. POIs 603 and 605 are arranged under sub-categories 602 and 604. These sub-categories may be included or omitted, or the order selected, depending on the context data. Further sub-categories 507 may also be suggested.

Figure 7:
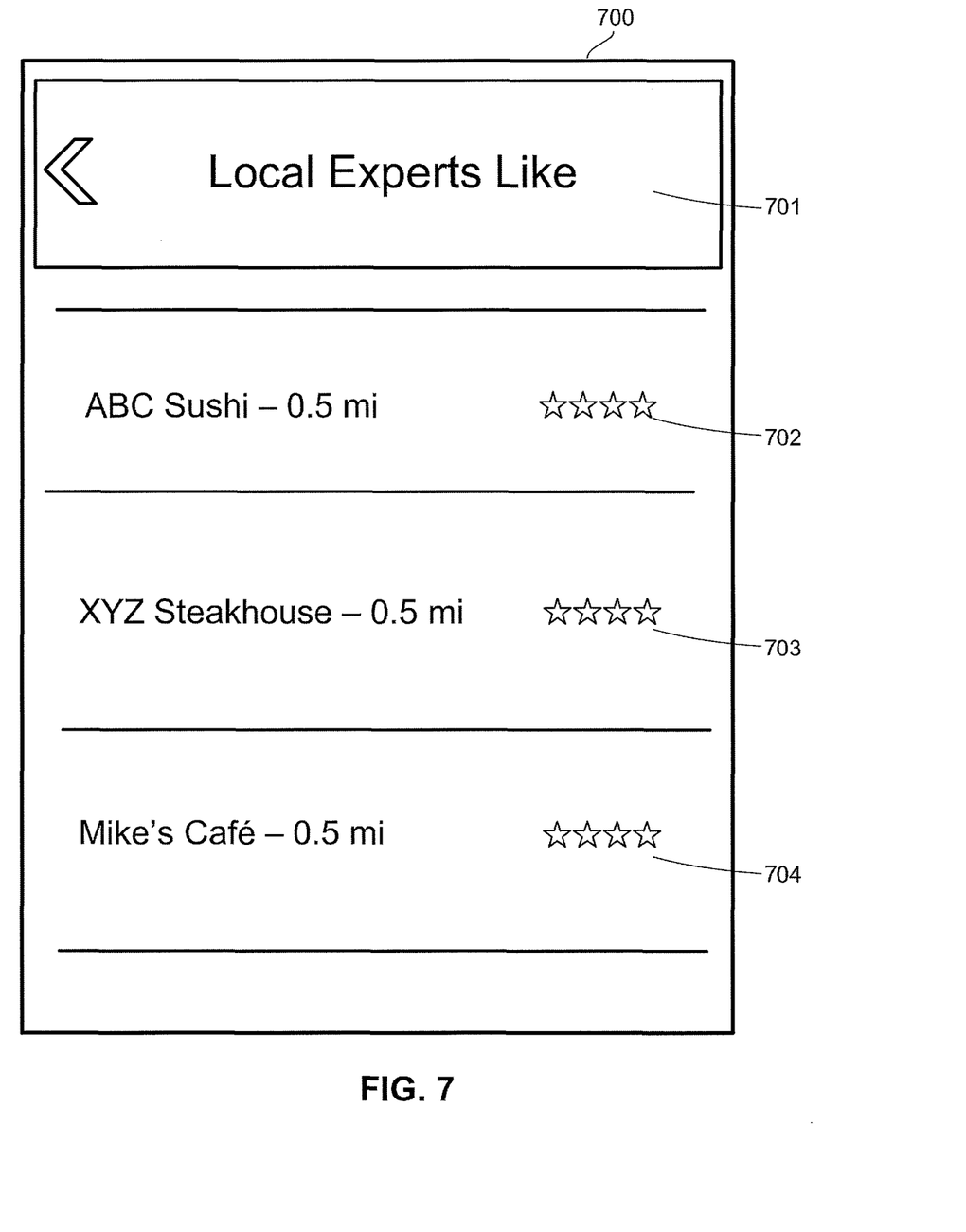
FIG. 7 illustrates an exemplary screen shot on a client computing device of POIs once there are no further potential sub-categories.

FIG. 7 illustrates an exemplary screen shot 700 on a client computing device of POIs once there are no further potential sub-categories. The category or sub-category 701 is optionally displayed at the top of the screen. Although this information could have been displayed on prior screens, here, for example, additional information is added for each POI 702, 703, and 704 such as a star rating and distance from the user's current location.

Figure 8:
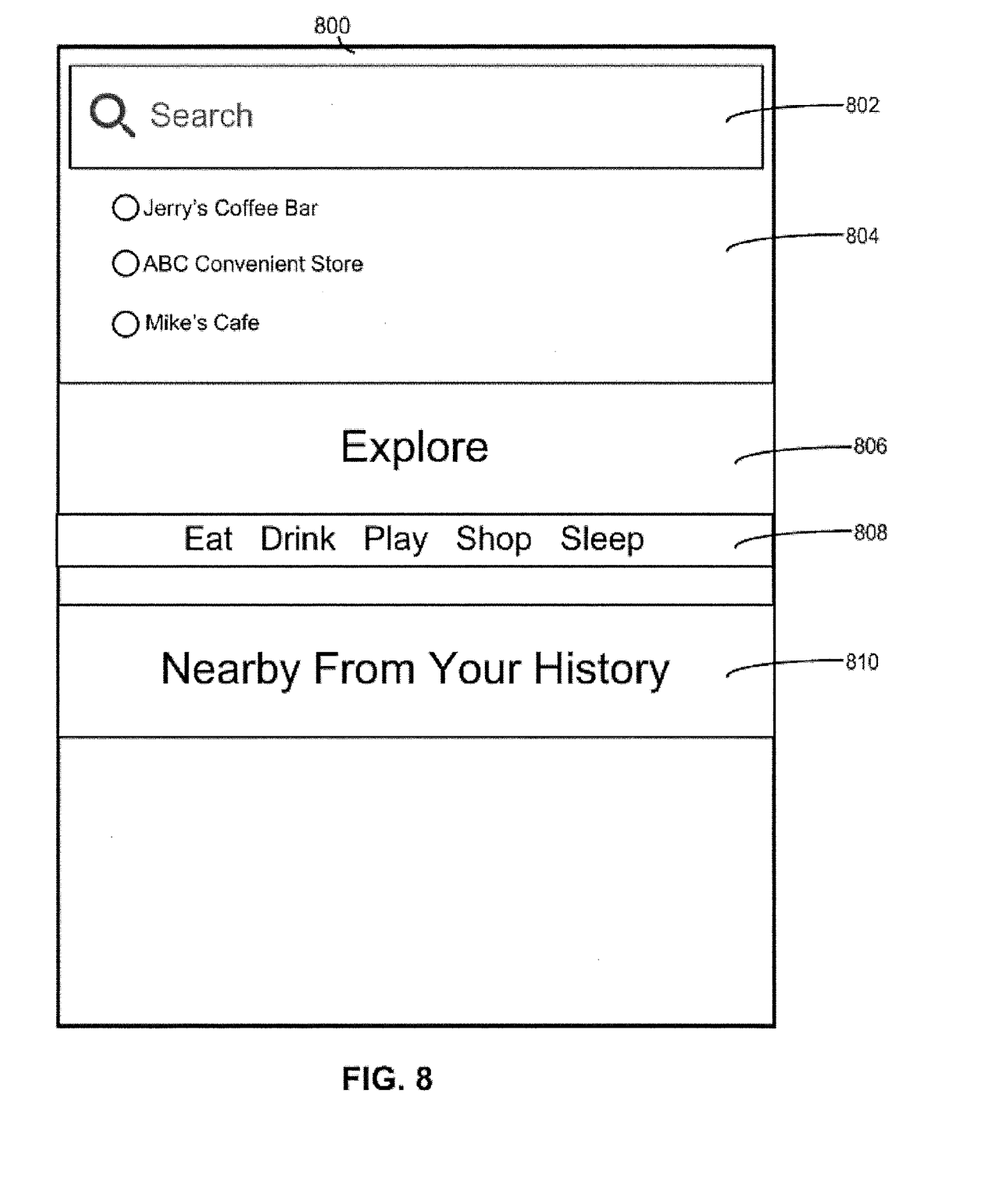
FIG. 8 illustrates an exemplary screen shot on a client computing device of POIs, an Explore element, and a Nearby From Your History element.

FIG. 8 illustrates another embodiment of an initial screen 800 for use with the system 100. The screen 800 may include several interactive elements including a search area 802, promoted POIs 804, an explore element 806 and explore categories 808, and a nearby from your history element 810. In some embodiments, this is the initial screen 800 the computing device displays to the user upon initiation of the mapping application 105 upon the user being classified as a tourist or local. The computing device 101 may process the received promotion data to display each of the promoted POIs 804 and the explore categories 808. The screen 800 may allow the user to interact with one or more elements displayed on the screen by selecting an element (e.g., by a touch or other gesture, mouse click, mouse over, or other action with a pointer, pressing an enter key, etc.). The promoted POIs 804 may be determined based on user context data (e.g., a tourist or local). Context data may also include location, time, user profile data, user favorites or a search history, etc. The explore categories 808 may also be promoted based on the context data. For example, when the system determines that a user is a tourist, categories of Eat, Drink, Play, Shop, and Sleep may be promoted over categories that are typically associated with local users or users that are familiar with the area corresponding to the current location of the computing device 101. These categories may be promoted in a particular order, or categories may be included or omitted based on the context data.

Figure 9:
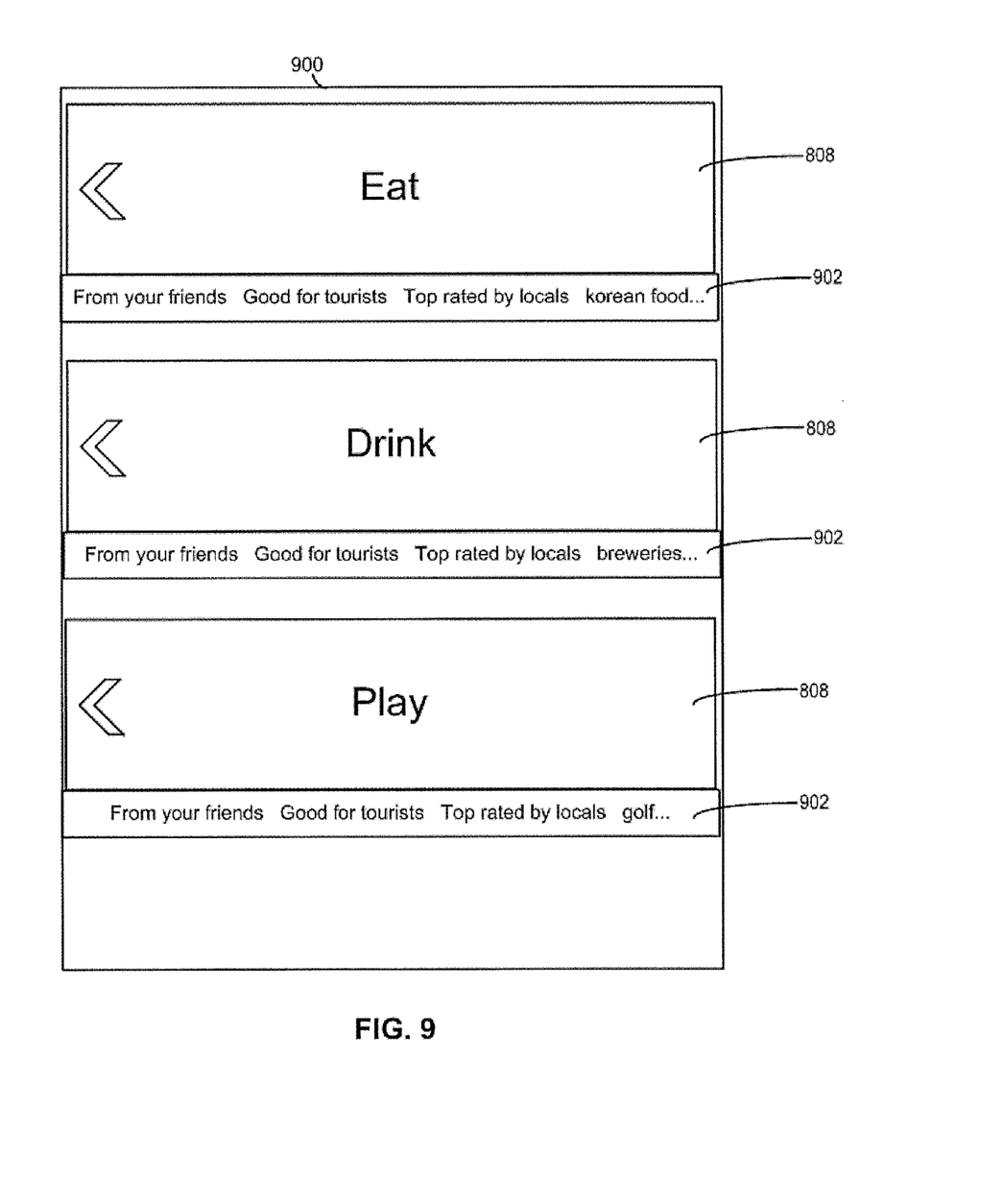
FIG. 9 illustrates an exemplary screen shot on a client computing device of POI categories and POI sub-categories resulting from selection of an Explore element.

Selecting the Nearby From Your History element 810 may cause the computing device 101 to execute instructions to display various POIs from a user's search history or user profile that are nearby to the current location of the computing device 101. Selecting the explore element 806 may cause the computing device 101 to execute instructions to display a further screen 900 (FIG. 9). Screen 900 may include each of the explore categories 808, and also sub-categories 902. The subcategories 902 may include further categories based on one or more criteria. For example, the criteria may include POIs that your friends have liked using social media data, POIs based on the user classification as a tourist or a local, POIs based on purely local users' ratings, and also POIs based on personal profile or other data (e.g., search history, favorites, profile information indicating hobbies or interests, etc.).

Figure 10:
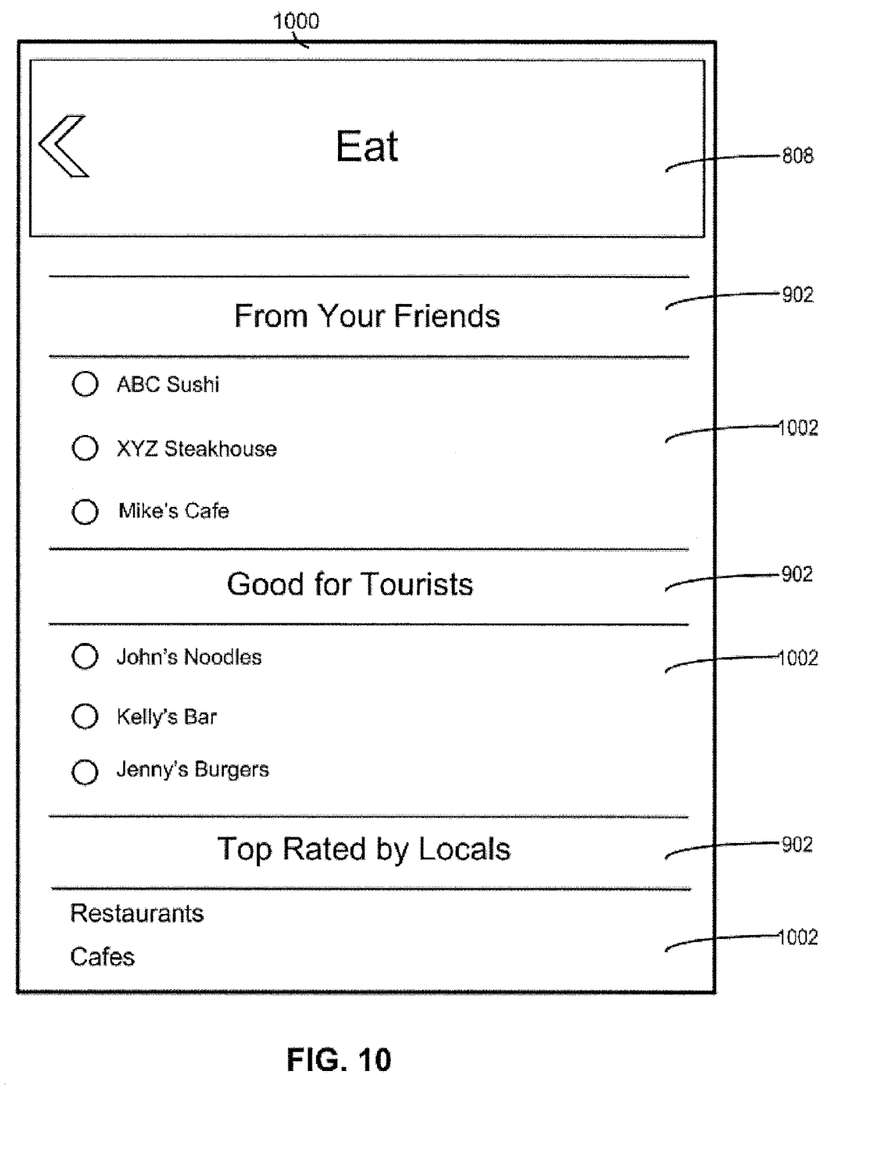
FIG. 10 illustrates an exemplary screen shot on a client computing device of POI categories, POI sub-categories, and POIs within those sub-categories resulting from selection of a category.

Selecting the Eat category may cause the computing device 101 to execute instructions to display a further screen 1000 (FIG. 10). Screen 1000 may include each of the sub-categories 902 as well as POIs 1002 that have been identified as related to criteria within each sub-category 902. For example, here the user has selected the "Eat" category 808. POIs 1002 are arranged under sub-categories 902. These sub-categories may be included or omitted, or the order selected, depending on the context data (i.e., tourist or local user). Further sub-categories 902 may also be suggested.

Figure 11:
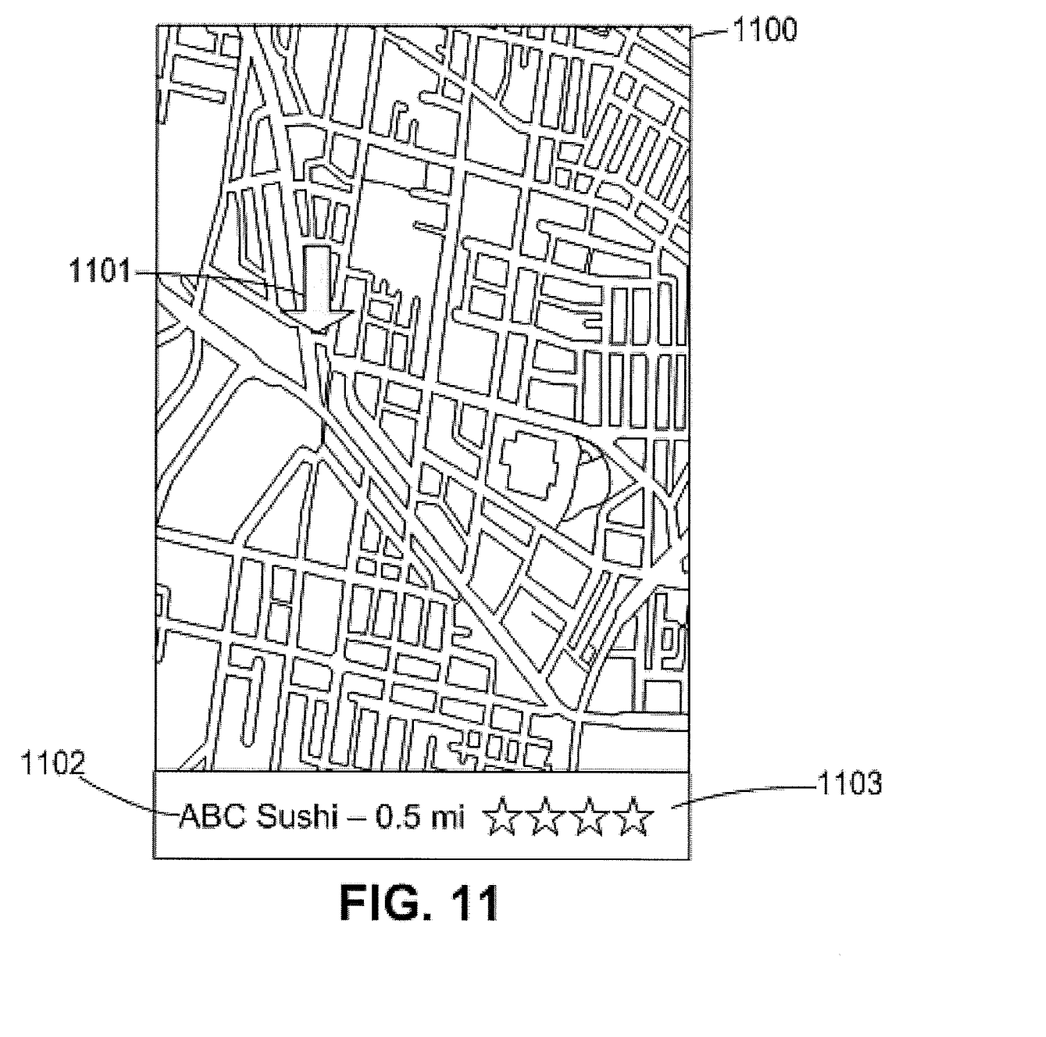
FIG. 11 illustrates an exemplary screen shot on a client computing device of a POI on a map after selection by the user.

FIG. 11 illustrates an exemplary screen shot on a client computing device of a POI on a map after selection by the user. Upon selection of a POI, the user is shown on the display 1100 the location of the POI 1101 on a map. Also, in this example, the name of the POI 1102 and the rating and distance 1103 are also shown.

As described, the computer system and method provides points of interest (POIs) suggestions to a user of a mapping application on a computing device. These suggestions are determined based on context information, such as, e.g., the location of the user, the familiarity of the user with the location, time of day, information about the POIs, and other user profile data. Information about the POIs, such as, e.g., categories, sub-categories, recommendations, and distance, can be used to determine the suggestions and organize suggestions into categories of POIs. Once suggestions of POIs and/or categories of POIs have been suggested to the user, the user may navigate through the suggestions and subsequently request more information on the suggestions. If the user selects a suggested POI, information on that particular POI is requested, and that POI is displayed in the mapping application on the computing device.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for pre-fetching place page data for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for generating and displaying suggestions of points of interest based on user context information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for promoting points of interest (POIs) for display on a digital map at a client computing device based on context information associated with a user, the method comprising:
   receiving, by one or more processors, location data from a client computing device, the location data indicating a current geographic location of the computing device;
   determining, by the one or more processors, a user classification using (i) the location data and (ii) user profile data, the user classification indicating a degree of familiarity with the location indicated by the location data, including determining whether the user is one of (i) a tourist or (ii) a local;
   determining, by the one or more processors, first promotion data when it is determined that the user is a tourist and second promotion data when it is determined that the user is a local, the promotion data indicating one or more sets of POIs to be promoted; and
   sending, by the one or more processors, the determined promotion data to the client computing device, wherein the promotion data enables display on the client computing device of the one or more indicated sets of POIs to generate a first screen when the user is a tourist and a second screen when the user is a local, wherein the first screen and the second screen include different sets of POIs.

2. The method of claim 1, further comprising:
   subsequently receiving a request for mapping data, wherein the requested mapping data corresponds to a location of a promoted POI; and
   sending the requested mapping data to the client computing device in response to the subsequent request.

3. The method of claim 1, wherein the first and second promotion data is determined using the time of day.

4. The method of claim 1, wherein the first and second promotion data comprises a set of POIs and the set of POIs comprises recommended POIs based on at least location data, user profile data, and user classification.

5. The method of claim 1, wherein the first and second promotion data comprises a set of categories of POIs.

6. The method of claim 1, further comprising determining, by the one or more processors, whether the user arrived at the current location from a different country within a certain interval of time, and wherein determining the first and second promotion data includes selecting promotion data for a service specifically tailored to needs of newly arrived foreign tourists.

7. The method of claim 1, further comprising:
   determining, by the one or more processors, a display order of the promoted POIs.

8. The method of claim 1, wherein determining the promotion data includes determining the promotion data based further on one or more of (i) recommendations of the users' friends indicated via social media , or (ii) recommendations by local experts.

9. A computer-implemented method for promoting points of interest (POIs) for display on a digital map at a mobile computing device based on context information associated with a user, the method comprising:
   sending, by one or more processors, location data from a mobile computing device, the location data indicating a geographic location of the computing device;
   receiving, by the one or more processors, first promotion data in response to user classification into a tourist or second promotion data in response to user classification into a local, wherein the first or second promotion data is based on the location data and indicates of ore more sets of POIs to be promoted, and wherein the user classification is based on a degree of familiarity with the location indicated by the location data and user profile data;

promoting, by the one or more processors, the one or more sets of POIs on the mobile computing device to generate a first screen when the user is a tourist and a second screen when the user is a local, wherein the first screen and the second screen include different sets of POIs;

sending, by the one or more processors, a request for mapping data, wherein the requested mapping data corresponds to a promoted POI; and receiving, by the one or more processors, the requested mapping data on the mobile computing device in response to the subsequent request.

10. The method of claim 9, wherein a mapping application is initiated by the user prior to sending location data from the mobile computing device.

11. The method of claim 9, wherein the step of sending location data from the mobile computing device is performed prior to the user initiating a mapping application.

12. The method of claim 9, wherein the first and second promotion data is determined using the time of day.

13. The method of claim 9, wherein the first and second promotion data comprises a set of POIs.

14. The method of claim 13, wherein the set of POIs comprises recommended POIs based on at least location data, user profile data, and user classification.

15. The method of claim 9, wherein the first and second promotion data comprises a set of categories of POIs.

16. The method of claim 15, wherein the categories of POIs are types of POIs.

17. The method of claim 9, further comprising:
receiving, by the one or more processors, a display order of the promoted POIs.

18. A computer system for promoting points of interest (POIs) for display on a digital map at a client computing device based on context information associated with a user, the system comprising:

one or more processors;
a non-transitory computer-readable medium storing thereon instructions that implement a point of interest selection system for execution on the one or more processors to:
receive location data from a client computing device, the location data indicating a geographic location of the computing device,
determine a user classification using (i) the location data and (ii) user profile data, the user classification indicating a degree of familiarity with the location indicated by the location data, including determining whether the user is one of (i) a tourist or (ii) a local, and
determine first promotion data when it is determined that the user is a tourist and second promotion data when it is determined that the user is a local, the promotion data indicating one or more sets of POIs to be promoted;
a mapping system in communication with a memory storing instructions for execution on a processor of the mapping system, the instructions to:
send promotion data to the client computing device, wherein the promotion data enables display on the client computing device of the one or more indicated sets of POIs,
subsequently receive a request for mapping data, wherein the requested mapping data corresponds to the location of a promoted POI, and
send the requested mapping data to the client computing device in response to the subsequent request to generate a first screen when the user is a tourist and a second screen when the user is a local, wherein the first screen and the second screen include different sets of POIs.

* * * * *